US 6,618,003 B2

(12) United States Patent
Voigtlaender et al.

(10) Patent No.: US 6,618,003 B2
(45) Date of Patent: Sep. 9, 2003

(54) METHOD OF DETECTING INTERFERENCE CONDITIONS OF A RADAR DEVICE AND A RADAR DEVICE

(75) Inventors: Klaus Voigtlaender, Wangen (DE); Arno Schaumann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/080,651

(22) Filed: Feb. 22, 2002

(65) Prior Publication Data

US 2002/0130811 A1 Sep. 19, 2002

(30) Foreign Application Priority Data

Feb. 22, 2001 (DE) .......................... 101 08 582

(51) Int. Cl.⁷ ............................... G01S 7/292
(52) U.S. Cl. ...................... 342/159; 342/70; 342/162
(58) Field of Search ................. 342/159, 161–162, 342/165, 168, 173–174, 70–72

(56) References Cited

U.S. PATENT DOCUMENTS

| | | | | | |
|---|---|---|---|---|---|
| 3,979,752 A | * | 9/1976 | Charlot | ......................... | 342/92 |
| 4,040,057 A | * | 8/1977 | Cross et al. | ................. | 342/159 |
| 4,622,555 A | * | 11/1986 | Doggett et al. | ............... | 342/84 |
| 4,717,917 A | * | 1/1988 | Alitz | ......................... | 342/137 |
| 5,565,870 A | * | 10/1996 | Fukuhara et al. | ............. | 342/70 |
| 5,764,697 A | * | 6/1998 | Sakuma et al. | ............. | 375/239 |
| 6,049,302 A | * | 4/2000 | Hinckley, Jr. | ................ | 342/99 |
| 6,141,371 A | * | 10/2000 | Holmes et al. | ............. | 375/130 |
| 6,148,020 A | * | 11/2000 | Emi | ........................... | 375/132 |
| 6,208,248 B1 | * | 3/2001 | Ross | ......................... | 340/552 |

* cited by examiner

Primary Examiner—Thomas H. Tarcza
Assistant Examiner—Isam Alsomiri
(74) Attorney, Agent, or Firm—Kenyon & Kenyon

(57) ABSTRACT

A radar device and a method of detecting interference conditions of a radar device includes the following steps: detecting irregularities in reception of signals, deactivating the transmission branch, and detecting the presence or absence of target signals.

18 Claims, 6 Drawing Sheets

METHOD OF DETECTING INTERFERENCE CONDITIONS OF A RADAR DEVICE AND A RADAR DEVICE

FIELD OF THE INVENTION

The present invention relates to a method of detecting interference conditions of a radar device. The present invention also relates to a radar device.

BACKGROUND INFORMATION

There are numerous applications for radar devices in various fields of the industry. For example, the use of radar sensors is possible for short-range sensors in motor vehicles.

Essentially, a sending antenna in such radar devices emits electromagnetic waves. When these electromagnetic waves strike an obstacle, they are reflected and received by another antenna or the same antenna after being reflected. The received signals are then sent to a signal processing and analyzing unit.

In motor vehicles, for example, radar sensors are used for measuring the distance from targets and/or the relative velocity with respect to such a target outside the motor vehicle. Targets include, for example, parked vehicles or vehicles driving in front, pedestrians, cyclists or devices in the vicinity of the vehicle.

FIG. 1 is a schematic block diagram of a radar device having a correlation receiver according to the related art. A transmitter 300 is prompted by a pulse generator 302 to send a transmission signal 306 over antenna 304. Transmission signal 306 also strikes a target object 308, where it is reflected. Reception signal 310 is received by antenna 312. This antenna 312 may be identical to antenna 304. After receiving reception signal 310 by antenna 312, the signal is sent to receiver 314 and then supplied over a unit 316 having a low-pass filter and analog-digital conversion to a signal analyzer 318. The special feature of this correlation receiver is that receiver 314 receives a reference signal 320 from pulse generator 302. Reception signals 310 received by receiver 314 are mixed with reference signal 320 in receiver 314. Through correlation it is possible to determine, for example, the distance of a target object on the basis of the time lag from sending to receiving the radar pulses.

It is possible to operate between 4 and 16 such sensors, for example, on a vehicle. The sensors are arranged in space in such a manner that they have practically no mutual influence on one another. However, problems may occur in approaching other vehicles, as in a parking procedure or in stop-and-go driving. It is also possible that interference may also occur due to other wireless services, thus creating false targets in this manner. Such faulty detection of a false target is a disadvantage and may even cause risks during driving operation.

SUMMARY

The present invention relates to a method of detecting interference conditions of a radar device, having the following steps: detecting irregularities in reception of signals, deactivation of the transmission branch, and detection of the presence or absence of target signals. If irregularities in the reception part, e.g., very rapidly changing targets, high-speed targets or targets with distances that change suddenly, are detected as part of the method according to the present invention, it is assumed that this is due to interference. Likewise, interference may also involve the sensor being blind, i.e., not detecting any targets at all. In these cases, the transmission branch of the radar device is shut down or, in more general terms, transmission of a transmission signal by the radar device is prevented. However, the correlation pulses are still sent to the mixer in the reception branch. The method according to the present invention determines whether target information is still being detected when the transmitter is deactivated. If this is the case, then it is determined that this is due to interference. It is thus possible to infer whether target information is faulty by detection of irregularities and performing a subsequent check.

Following detection of the presence of target signals, they may be eliminated on a software basis. This is possible in particular when static information is available, e.g., the information that a target is at a certain distance.

The method according to the present invention, however, may also be refined by eliminating the target signals, after their presence has been detected, by changing the mid-frequency of the radar device. This variant is used in particular for eliminating deterministically variable targets. A periodic or chaotic shift, for example, may be considered for changing the mid-frequency.

It may also be useful for the method according to the present invention to be performed in such a manner that after the presence of target signals is detected, they are eliminated by changing the pulse repetition frequency of the radar device. In this manner it is also possible to alter the radar device so that false targets are no longer detected, but real targets are still taken into account in the same manner.

Following detection of the presence of target signals, they may be eliminated by a notch filter. This may be beneficial if the interference is monochromatic or almost monochromatic. The interference frequencies are eliminated by the notch filter, so that radar operation is ultimately free of interference.

The method according to the present invention may be refined so that following detection of the presence of target signals, they are eliminated by pulse coding. For example, switching from pulse modulation to frequency modulation is one option. It is also possible to code the pulses by a PN coding method (PN=pseudo noise).

The method may also be improved upon beneficially so that following detection of the presence or absence of target signals, a continuous carrier signal is sent to a mixer in the reception branch, and the interference carrier frequency is determined by detuning the continuous carrier signal. This may be advantageous if sporadic signals are present. Due to the continuous carrier at the mixer in the reception branch, the received signals may be converted to a low frequency, e.g., in a range below 2 GHz. The interference carrier frequency may be determined by detuning the frequency.

In a comparable manner, the method may also be performed so that following detection of the presence or absence of target signals, the interference carrier frequency is determined by tuning a PLL source. Providing such a PLL source in the reception branch makes a variable carrier dispensable. However, an increased circuit complexity is necessary in the respective frequency range, e.g., in the range of 2 GHz.

The measurement may be declared invalid in the case when the interference signals are not eliminated. If the interference targets are not eliminated by the measures performed as part of the method according to the present invention, the entire measurement is discarded, so that this method ultimately permits a reliable determination of true signals and elimination of false targets.

The present invention also relates to a radar device having an arrangement for detecting irregularities in reception of signals, an arrangement for deactivating the transmission branch and an arrangement for detecting the presence or absence of target signals. The advantages of the method of detecting interference conditions of a radar device may be implemented with such a radar device.

This radar device may be beneficial if, following detection of the presence of target signals, the target signals may be eliminated on a software basis. In particular, faulty static information may be eliminated with such a configuration of the radar device.

The radar device according to the present invention may be improved upon in that following detection of the presence of target signals, they may be eliminated by altering the mid-frequency of the radar device. The mid-frequency may be changed periodically or chaotically. This may eliminate deterministically variable targets.

In an example embodiment of the radar device, it may also be provided that, following detection of the presence of target signals, they may be eliminated by altering the pulse repetition frequency of the radar device. This is another variant for eliminating false targets, but a change in pulse repetition frequency is performed here as an essential measure.

Following detection of the presence of target signals, it is also possible for these signals to be eliminated by a notch filter. Such a radar device may eliminate monochromatic interference in particular.

In another example embodiment of the radar device according to the present invention, it may be provided that, following detection of the presence of target signals, they may be eliminated by pulse coding. Different modulation methods may be used for pulse coding, either individually or in combination.

The radar device may be refined by the fact that, following detection of the presence or absence of target signals, a continuous carrier signal is sent to a mixer in the reception branch and the interference carrier frequency may be determined by detuning the continuous carrier signal. Since sporadic signals cannot be eliminated through the changes in the signals described, the radar device may be configured so that the received signals are converted to a low frequency, e.g., in a range below 2 GHz, by a continuous carrier at the mixer in the reception branch. The interference carrier frequency may be determined by detuning the frequency.

In another example embodiment, however, it may also be possible that following detection of the presence or absence of target signals by tuning a PLL source, the interference carrier frequency may be determined. This measure is comparable to detuning the continuous carrier frequency on the mixer in the reception branch. However, due to the fact that a PLL source is provided, a variable carrier frequency may be omitted.

In the case when the interference signals are not eliminated, the measurement may be declared invalid. If the measures to eliminate the interference signals fail, the entire measurement is discarded. The radar device thus ultimately permits a reliable determination of real targets and elimination of false targets.

The present invention is based on the finding that, due to the detection of irregularities in reception of signals and due to the subsequent testing of target signals when the operation of the radar device is altered, it is possible to detect and eliminate interference signals. This interference detection may also be used for multisensor platforms for mutual synchronization or frequency tuning of the sensors among one another. The present invention may be used to advantage in the automotive field so that ultimately driving convenience and safety are improved.

DETAILED DESCRIPTION

Figure 1:
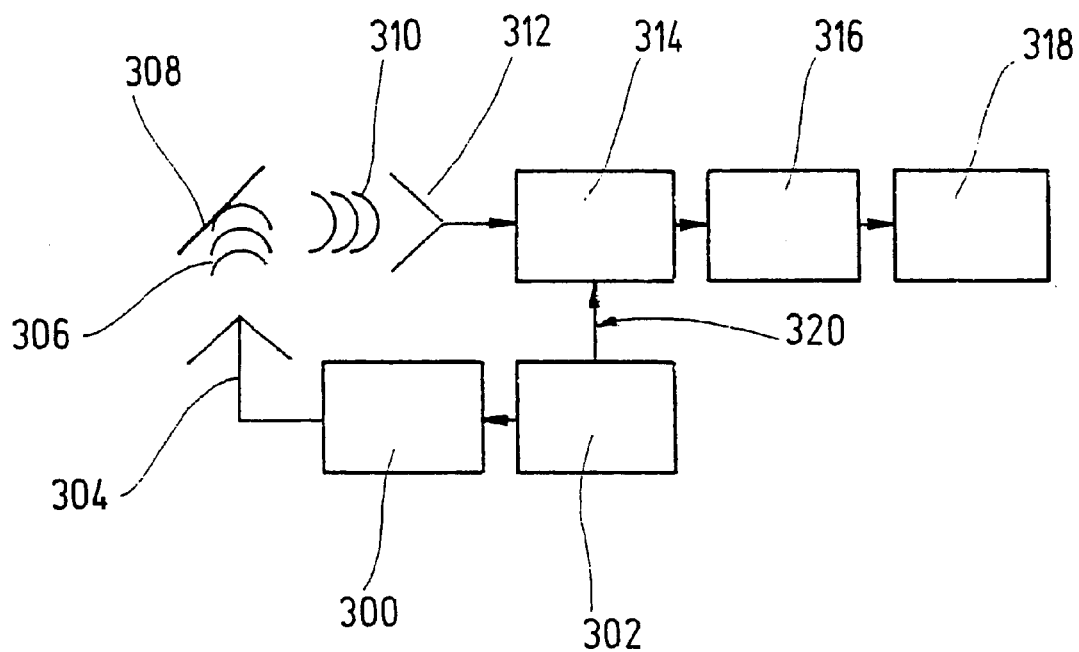
FIG. 1 illustrates a radar device according to the related art.
Figure 2:
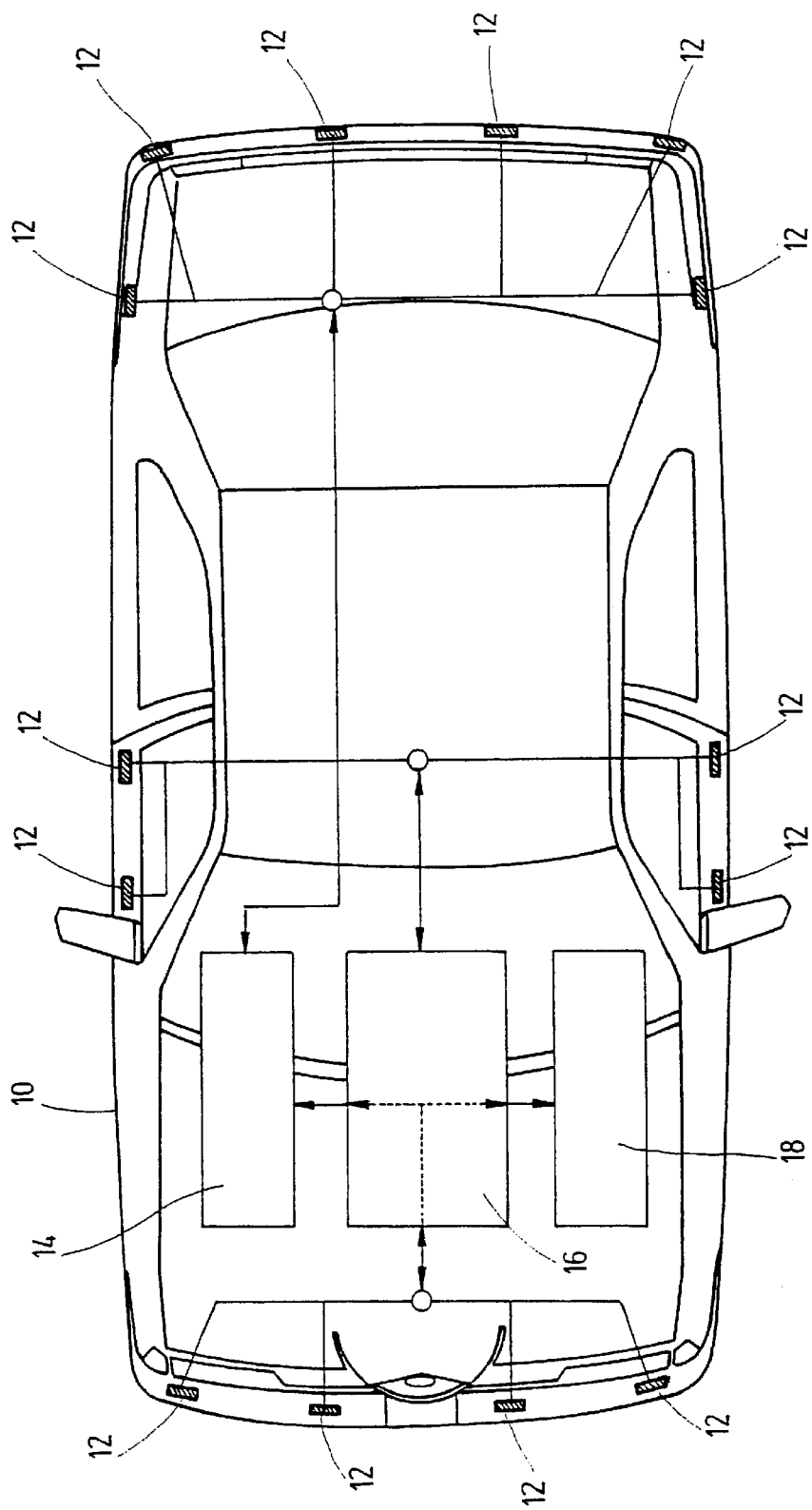
FIG. 2 illustrates a motor vehicle having radar devices.

FIG. 2 illustrates a motor vehicle 10 on which are arranged multiple radar sensors 12. The radar sensors are connected to one another over a bus concept and to control and monitoring units, in particular a unit 14 which is provided for supplying a parking aid and for detection of a blind spot, a unit 16 for the precrash function and a unit 18 for stop and go.

Figure 3:
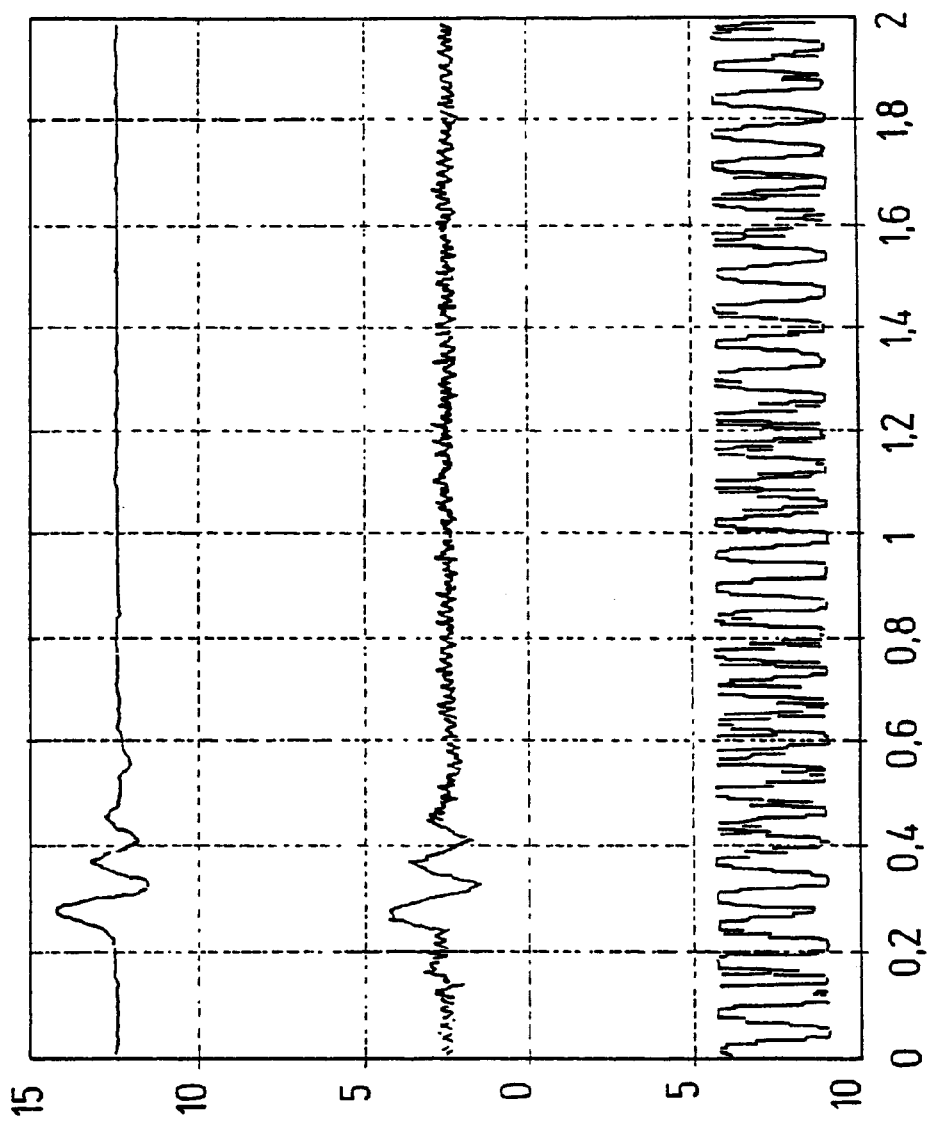
FIG. 3 illustrates signals having interference to different extents.

FIG. 3 illustrates curves for signals picked up by a short-range radar device. The upper signal curve is without interference. The middle signal curve is influenced by a strong interference which is caused in the present case by a FMCW radar, for example. The lower signal is influenced by a very strong interference of the same type.

Figure 4:
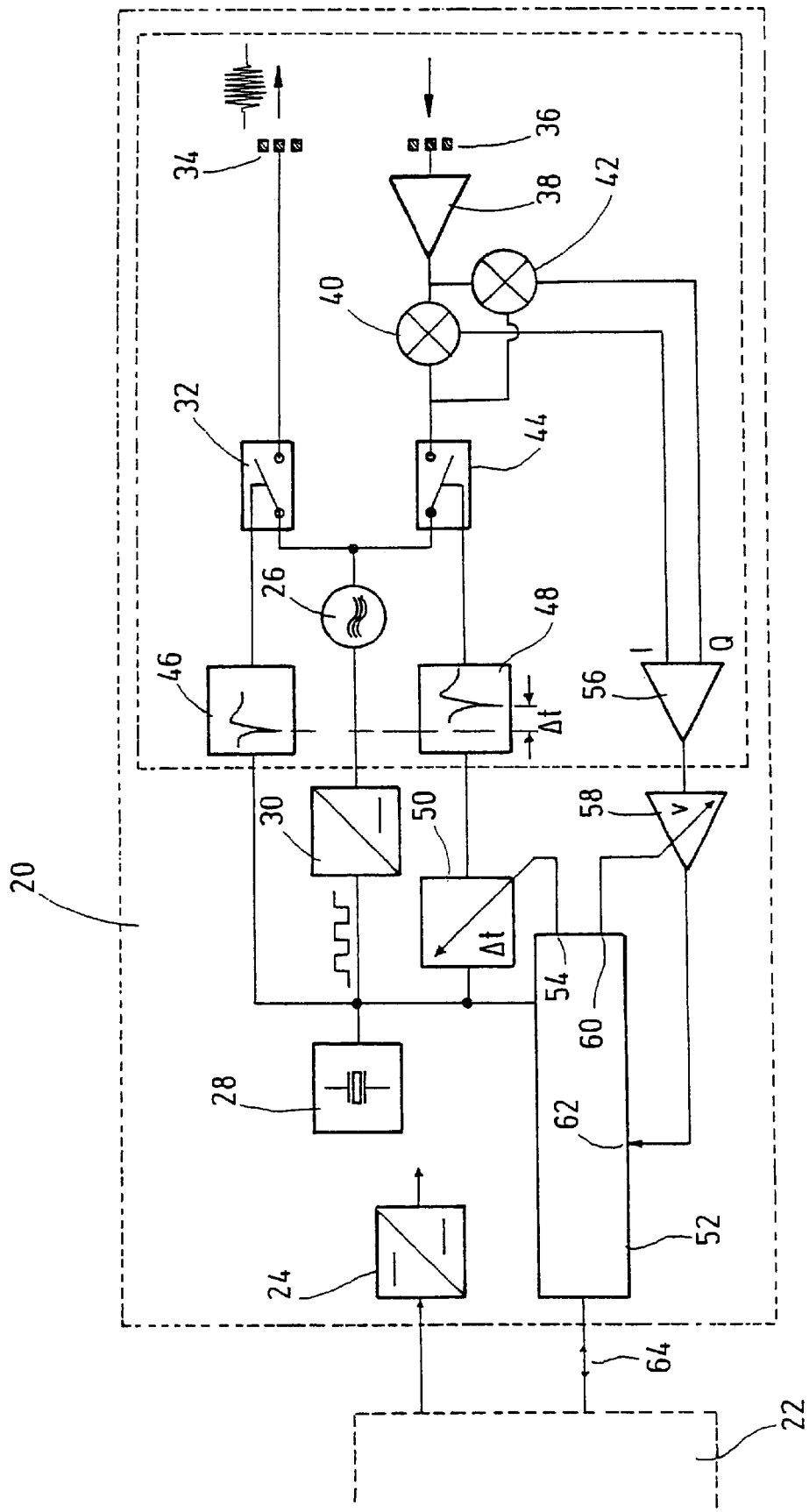
FIG. 4 illustrates an example embodiment of a radar device configured to perform the method according to the present invention.

FIG. 4 schematically illustrates the configuration of a sensor 20 which is used in short-range radar. A voltage, e.g., 8 V, is supplied to sensor 20 by an electronic control unit 22. This voltage is transformed in a DC-DC transformer, so that ultimately the power supply voltage, e.g., 5 V, is made available for the sensor components. A carrier frequency of 24 GHz, for example, is supplied by a local oscillator 26. This local oscillator 26 is supplied with a bias voltage which is ultimately generated by a transformer 30 from pulses supplied by a clock pulse generator 28. The pulses generated by clock pulse generator 28 may have a frequency of 5 MHz, for example, and are used for modulation of carrier signals supplied by local oscillator 26. This modulation is performed in a transmission branch by switch 32, which is switched by a pulse shaper 46. Pulse shaper 46 is in turn controlled by the clock frequency of clock pulse generator 28. The pulsed signals generated in this manner are sent out by antenna 34. In the case of reflection of the signals sent out by antenna 34, they are received by receiving antenna 36. After amplification of the received signals in an amplifier 38, the signals are sent to two mixers 40, 42, a first mixer 40 supplying an I signal and a second mixer 42 delivering a Q signal. In mixers 40, 42, the received signals are mixed with the pulsed signals of local oscillator 26, with this pulsing occurring over a switch 44. The switch is controlled by a pulse generator 48 which outputs pulses delayed by a time delay Δt with respect to the pulses output by pulse generator 46. This time delay is supplied by a time-delay circuit 50. The time delay of time-delay circuit 50 is influenced by a microcontroller 52 which has a digital signal processor. This occurs through a first analog output 54 of microcontroller 52. I and Q signals processed by an amplifier 56 are influenced by further variable amplification in amplifier 58 over a second analog output 60. This variable amplifier 58 is influenced by a second analog output 60 of microcontroller 52. The output signal of variable amplifier 58 is sent to an analog input 62 of microcontroller 52. Microcontroller 52 communicates with electronic control unit 22 over an input-output bus 64 (I/O bus).

If it is found as part of an example method according to the present invention that irregularities occur in reception of signals, the transmission branch of radar sensor 20 is deactivated as illustrated in FIG. 4. Thus, no more transmission signals are sent out by sending antenna 34. However, correlation pulses are still being sent by pulse generator 48 to the reception branch of radar sensor 20. If it is found in this state, in which the transmission branch is shut down, that target information is still being received, it may be concluded that there is a false signal. If static target information occurs, it may be eliminated through software, e.g., in electronic control unit 22. Deterministically variable targets may be eliminated through a different choice of the mid-frequency of local oscillator 26 or the pulse repetition frequency supplied by clock pulse generator 28. If sporadic signals occur, they may not be taken into account using only the measures described so far. This is taken into account by the fact that a continuous carrier is applied to mixers 40, 42, so the received signals are transformed to a lower frequency. The interference carrier frequency may be determined by detuning the carrier frequency.

Figure 5:
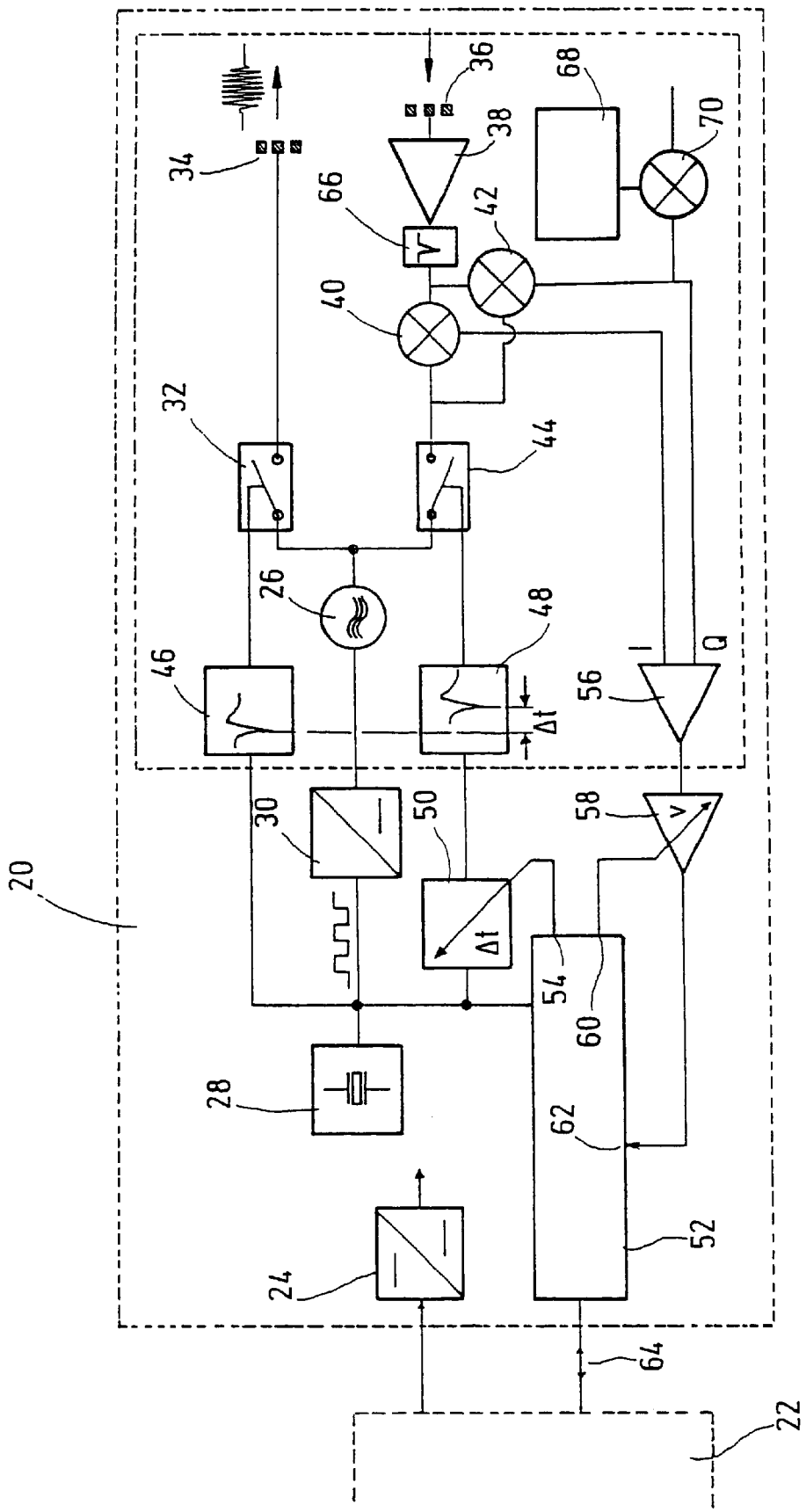
FIG. 5 illustrates another example embodiment of a radar device configured to perform the method according to the present invention.

FIG. 5 illustrates a circuit which corresponds largely to the circuit illustrated in FIG. 4. In addition, a notch filter 66 provided in the reception branch may be used to advantage in particular when there is monochromatic or almost monochromatic interference. In addition to the components illustrated in FIG. 4, the circuit illustrated in FIG. 5 is also equipped with a PLL circuit 68 and an additional mixer 70. By tuning this PLL source 68, the interference frequency may be determined, i.e., on the basis of the arrangement illustrated in FIG. 5, it is no longer necessary to detune the carrier frequency.

Figure 6:
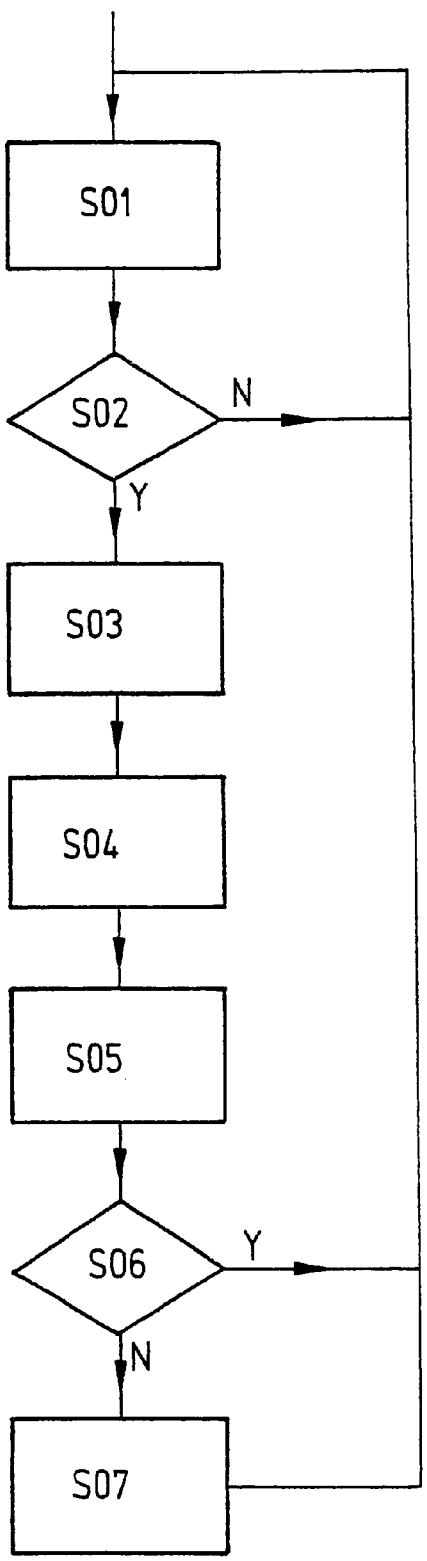
FIG. 6 is a flow chart illustrating an example method according to the present invention.

FIG. 6 is a flow chart illustrating an example method according to the present invention.

First, the meaning of the example method steps illustrated is listed:

S01: normal operation.
S02: irregularities? blind?
S03: turn off transmitter; pulsed reception or continuous reception.
S04: analysis of the interference.
S05: attempt to eliminate interference.
S06: interference eliminated?
S07: measurement invalid.

Starting from normal operation in step S01, a check is performed in step S02 to determine whether there are irregularities in reception or whether the sensor is blind. Likewise, the CFAR method (CFAR=constant false alarm rate) may be used as interference detection. In this example method, the noise amplitude is measured in a certain window. The analyzing position is selected so that the signal-to-noise ratio remains constant. An increase in the noise component may then be interpreted as detection of interference. If it is detected in step S02 that there are no irregularities and the sensor is not blind, then the program sequence goes to normal operation. In the other case, i.e., there are irregularities or the sensor is blind, then the transmitter is deactivated in step S03. In addition, there is pulsed reception or continuous reception. In step S04, the interference is analyzed. Following that in step S05, an attempt is made to eliminate the interference. This may be done, for example, by changing the mid-frequency, by changing the pulse repetition frequency, by using a notch filter or by changing the modulation scheme. Interference signals may also be eliminated through software. In step S06, a check is performed to determine whether the interference has been eliminated. If this is the case, it is possible to switch to normal operation. In the other case, the measurement is declared invalid in step S07.

The preceding description of example embodiments according to the present invention is presented only for the purpose of illustration and does not limit the scope of the present invention. Various changes and modifications are possible without going beyond the scope of the present invention or its equivalents.

What is claimed is:

1. A method of detecting interference conditions of a radar device, comprising the steps of:
   detecting irregularities in reception of signals;
   deactivating a transmission branch; and
   detecting one of a presence and absence of target signals in reception of additional signals, wherein the additional signals are received when the transmission branch is deactivated.

2. The method of claim 1, further comprising the step of eliminating the detected target signals through software.

3. The method of claim 1, further comprising the step of eliminating detected target signals by changing a mid-frequency of the radar device.

4. The method of claim 1, further comprising the step of eliminating detected target signals by changing a pulse repetition frequency of the radar device.

5. The method of claim 1, further comprising the step of eliminating detected target signals by a notch filter.

6. The method of claim 1, further comprising the step of eliminating detected target signals by pulse coding.

7. The method of claim 1, further comprising the steps of:
   sending a continuous carrier signal to a mixer in a reception branch; and
   determining the interference frequency by detuning a continuous carrier signal.

8. The method of claim 1, further comprising the step of determining an interference carrier frequency by tuning a PLL source.

9. The method of claim 1, further comprising the step of declaring a measurement invalid if interference signals are not eliminated.

10. A radar device, comprising:
    a first arrangement configured to detect irregularities in a reception of signals;
    a second arrangement configured to deactivate a transmission branch; and
    a third arrangement configured to detect one of a presence or an absence of target signals in reception of additional signals, wherein the additional signals are received when the transmission branch is deactivated.

11. The radar device of claim 10, further comprising software configured to eliminate the detected target signals.

12. The radar device of claim 10, further comprising a fourth arrangement configured to eliminate detected target signals in accordance with a change in a mid-frequency of the radar device.

13. The radar device of claim 10, further comprising a fourth arrangement configured to eliminate detected target signals in accordance with a change in a pulse repetition frequency of the radar device.

14. The radar device of claim 10, further comprising a notch filter configured to eliminate detected target signals.

15. The radar device of claim 10, further comprising a fourth arrangement configured to eliminate detected target signals in accordance with pulse coding.

16. The radar device of claim 10, further comprising a fourth arrangement, the fourth arrangement, in response to detected target signals, configured to send a continuous carrier signal to a mixer in a reception branch of the radar device and to determine an interference frequency by detuning the continuous carrier signal.

17. The radar device of claim 10, further comprising a fourth arrangement configured to determine an interference carrier frequency in accordance with tuning a PLL source.

18. The radar device of claim 10, further comprising a fourth arrangement configured to declare a measurement invalid in accordance with interference signals not being eliminated.

* * * * *